United States Patent
Iijima et al.

(10) Patent No.: US 10,343,733 B2
(45) Date of Patent: Jul. 9, 2019

(54) ADDITIONAL PROTECTIVE COVER FOR A CRAWLER TRAVELING BODY AND METHOD FOR ASSEMBLING SAME

(71) Applicant: Caterpillar SARL, Geneva (CH)

(72) Inventors: Seiji Iijima, Tokyo (JP); Takayuki Shiokawa, Tokyo (JP); Shinya Nakagawa, Tokyo (JP); Junichi Furukawa, Hyogo (JP)

(73) Assignee: Caterpillar SARL, Geneva (CH)

( * ) Notice: Subject to any disclaimer, the term of this patent is extended or adjusted under 35 U.S.C. 154(b) by 137 days.

(21) Appl. No.: 15/523,395

(22) PCT Filed: Oct. 26, 2015

(86) PCT No.: PCT/EP2015/074764
§ 371 (c)(1),
(2) Date: Apr. 30, 2017

(87) PCT Pub. No.: WO2016/066589
PCT Pub. Date: May 6, 2016

(65) Prior Publication Data
US 2017/0247069 A1    Aug. 31, 2017

(30) Foreign Application Priority Data
Oct. 31, 2014   (JP) ................................. 2014-222243

(51) Int. Cl.
*B62D 55/088* (2006.01)
*B62D 55/12* (2006.01)

(52) U.S. Cl.
CPC ........... *B62D 55/088* (2013.01); *B62D 55/12* (2013.01)

(58) Field of Classification Search
CPC .............. B62D 55/088; B62D 55/0882; B62D 55/0885; B62D 55/12; B62D 55/125; B62D 55/32
See application file for complete search history.

(56) References Cited

U.S. PATENT DOCUMENTS 4,104,930 A * 8/1978 Sanders ............... B62D 55/125
                                                                74/609
5,951,123 A * 9/1999 Bomstad ................. E02D 3/026
                                                                172/112

(Continued)

FOREIGN PATENT DOCUMENTS

| JP | 2008201356 A | * | 9/2008 |
| JP | 6385904 B2 | * | 9/2018 |
| WO | 99/36632 A1 |  | 7/1999 |

*Primary Examiner* — Kip T Kotter (57) ABSTRACT

PROBLEM: To provide a cover body (18) at a space X formed between a motor housing (14) and a sprocket (15) which are the components of a drive sprocket (10) of a base carrier (2) in a hydraulic shovel, so as to prevent foreign substances such as sand from entering into the space, and to be installed to the motor housing side (14) without forming a bolt hole. SOLUTION: A cover body (18) is formed to be a split-body divided to an upper half (19) and a lower half (20), and to be connected to each other to form a ring shape by connecting a connect bolt (23) formed at an adjacent part of the cover body (18). The cover body (18) is installed to the space X by inserting an adjust bolt (21) into a ring shaped main body part (19*a* and 20*a*) till abut the motor housing (14) tightly. An outlet (26) is formed as a notch on a cover body (19*d* and 20*d*) to discharge the foreign substances entering into the space X between the sprocket housing (15) and a tip end of the cover part.

7 Claims, 8 Drawing Sheets

(56) References Cited

U.S. PATENT DOCUMENTS

| | | | | |
|---|---|---|---|---|
| 6,231,136 B1* | 5/2001 | Freeman | ............... | B62D 25/16 |
| | | | | 305/107 |
| 6,293,631 B1 | 9/2001 | Freeman | | |
| 6,322,170 B1* | 11/2001 | Knell | ...................... | E02D 3/026 |
| | | | | 305/100 |
| 7,731,307 B1* | 6/2010 | Freeman | ............... | B60B 3/085 |
| | | | | 172/508 |
| 7,946,661 B1* | 5/2011 | Freeman | ............ | B62D 55/0882 |
| | | | | 305/107 |
| 9,333,999 B2* | 5/2016 | Weeks | ................... | B62D 55/20 |
| 2009/0085303 A1 | 4/2009 | Kometani et al. | | |
| 2011/0148188 A1 | 6/2011 | Larson et al. | | |
| 2012/0138373 A1* | 6/2012 | Jackson | ............... | B62D 55/125 |
| | | | | 180/9.62 |
| 2014/0125117 A1* | 5/2014 | Weeks | ................... | B62D 55/15 |
| | | | | 305/100 |
| 2015/0284042 A1* | 10/2015 | Kalmes | ............... | B62D 55/088 |
| | | | | 305/107 |

* cited by examiner

ADDITIONAL PROTECTIVE COVER FOR A CRAWLER TRAVELING BODY AND METHOD FOR ASSEMBLING SAME

CROSS-REFERENCE TO RELATED APPLICATIONS

This application is a national phase application of International Patent Application No. PCT/EP15/74764 filed Oct. 26, 2015, which claims priority to Japanese Patent Application No. 2014-222243 filed Oct. 31, 2014, both of which are incorporated by reference herein in their entireties for all purposes.

TECHNICAL FIELD

The present invention relates to the field of technology pertaining to an additional protective cover for preventing the entry of foreign matters into a drive sprocket of a construction machine with a crawler traveling body, such as a hydraulic shovel, and a method for assembling the additional protective cover.

BACKGROUND ART

This type of construction machine generally has a crawler traveling body which has an idler wheel (a driven wheel) at the front end portion of its longitudinally long traveling frame and a drive sprocket (a driving wheel) at the rear end portion of the same, and in which a crawler (an endless track) is wrapped around the idler wheel and the drive sprocket. In this traveling body, the drive sprocket is configured in such a manner that: a hydraulic drive motor is used as a driving source thereof; a' motor housing that includes the hydraulic drive motor therein and has mounting portion to be fixed to laterally inner side of the traveling frame; a sprocket housing rotatably supported on the laterally outer side of the motor housing; and a sprocket that comes into engagement with the crawler is integrally provided in the sprocket housing. Once the drive motor is driven, the sprocket is rotated by the drive motor to drive the crawler back and forth, and thus the construction machine can be traveled.

In this traveling body, a space is provided between the motor housing functioning as the mounting portion and the sprocket housing functioning as a rotary portion, so as not to create a sliding friction therebetween, and a floating seal is provided between the inner circumferential surfaces of the motor housing and the sprocket housing to close the space.

This type of construction machine is usually used in workplaces with severe conditions. In such workplaces, foreign matters such as sediments may reach the floating seal through the space between the motor housing and the sprocket housing, soon resulting in wear of the floating seal. Wear of the floating seal leads to problems not only the inhibition of smooth rotation of the sprocket housing but oil leakage.

Providing an additional protective cover to the space between the motor housing and the sprocket housing to prevent the entry of foreign matters such as sediments into this space has been proposed (see Patent Documents 1 and 2, for example).

Patent Document 1: Japanese Utility Model Application Publication No. H6-51082

Patent Document 2: Japanese Patent Application Laid-open No. 2013-189042

DISCLOSURE OF THE INVENTION

According to the technique disclosed in Patent Document 1, the space between the motor housing and the sprocket housing has a labyrinth structure with a L-shaped cross-section where the motor housing edge portion hangs over the sprocket housing edge portion. Due to this structure, once foreign matters enter this space, the foreign matters removal cannot be carried out easily even if detaching the additional protective cover. It causes poor maintenance ability.

The technique disclosed in Patent Document 2, on the other hand, configures a labyrinth structure in which the space formed between the opposing surfaces of the motor housing and the sprocket housing is shaped into a vertical groove, and the space formed between the additional protective cover and the sprocket housing continues from the foregoing space and extends to the outside, changing its shape from the shape of a horizontal groove to the shape of a vertical groove. Entry of foreign matters into the floating seal is prevented by this structure, and even if there is such entry, this structure enables easy removal of the foreign matters through detachment of the protective additional cover. However, it is troublesome to detach the additional protective cover every time to remove the foreign matters. Additionally, the motor housing needs to be provided with a bolt hole for enabling attachment of the additional protective cover, but in case where the motor housing has no space for a bolt hole, the motor housing needs to be replaced to larger one. Such a replacement to attach the additional protective cover for an existing construction machine is practically impossible. Furthermore, even if the motor housing has space to drill a bolt hole, it requires significant time and effort to do so, and in the meantime the user needs to entrust the concerned construction machine and therefore cannot perform any work for a long period of time. The present invention is designed to solve these problems.

In view of the foregoing circumstances, the present invention was contrived for the purpose of solving the problems described above. The invention according to claim 1 is an additional protective cover for preventing entry of foreign matters into a drive sprocket of a construction machine with a crawler traveling body, the construction machine including the crawler traveling body that has a crawler wrapped around an idler wheel provided at a front end portion of a traveling frame and the drive sprocket provided at a rear end portion of the traveling frame, and the drive sprocket that is configured by a driving source housing fixed to the traveling frame and including a driving source therein, and a sprocket housing provided so as to be rotatable with respect to the driving source housing, wherein the additional protective cover for covering a space between the driving source housing and the drive sprocket to prevent the entry of foreign matters such as sediments into the space is configured by at least two divided segments in which a coupling portion is provided at each of adjacent end portions of the segments such as to be coupled with one another by means of a coupling bolt, and the additional protective cover is also configured by a main body that revolves on a driving source housing outer circumferential surface by being in the coupled state, a cover portion that extends from the main body up to a position facing a sprocket housing outer circumferential surface and prevents the entry of foreign matters through the space between the driving source housing and the drive sprocket, and a mounting bolt that is screwed from the main body to come into abutment with the driving source housing outer circumferential surface to attach and fix the additional protective cover onto the driving source housing.

The invention according to claim 2 is the additional protective cover for preventing entry of foreign matters into a drive sprocket of a construction machine with a crawler traveling body according to claim 1, further comprising an outlet for discharging foreign matters that enter a space between the sprocket housing outer circumferential surface and a cover portion end surface.

The invention according to claim 3 is the additional protective cover for preventing entry of foreign matters into a drive sprocket of a construction machine with a crawler traveling body according to claim 1 or 2, wherein at least one of the segments is set with the cover portion end surface in abutment with an alignment jig placed on the sprocket housing outer circumferential surface, and is aligned as the main body becomes separated from the driving source housing outer circumferential surface by screwing the mounting bolt, and the remaining segment is coupled to this aligned segment.

The invention according to claim 4 is the additional protective cover for preventing entry of foreign matters into a drive sprocket of a construction machine with a crawler traveling body according to any one of claims 1 to 3, wherein the mounting bolt is locked by being adhered to a channel material that is inserted, in locked fashion, between a flange portion provided in a protruding manner in the main body and a bolt head of the mounting bolt.

The invention according to claim 5 is the additional protective cover for preventing entry of foreign matters into a drive sprocket of a construction machine with a crawler traveling body according to any one of claims 1 to 4, wherein displacement of the additional protective cover toward the sprocket housing is prevented by adhering an angle to the driving source housing, the angle being configured to come into engagement with a part of the bolt head of the mounting bolt at the sprocket housing side.

The invention according to claim 6 is a method for assembling an additional protective cover for preventing entry of foreign matters into a drive sprocket of a construction machine with a crawler traveling body, the construction machine including the crawler traveling body that has a crawler wrapped around an idler wheel provided at a front end portion of a traveling frame and the drive sprocket provided at a rear end portion of the traveling frame, and the drive sprocket that is configured by a driving source housing fixed to the traveling frame and including a driving source therein, and a sprocket housing provided so as to be rotatable with respect to the driving source housing, wherein the additional protective cover for covering a space between the driving source housing and the drive sprocket to prevent the entry of foreign matters such as sediments into the space is configured by at least two divided segments in which a coupling portion is provided at each of adjacent end portions of the segments such as to be coupled with one another by means of a coupling bolt, and the additional protective cover is also configured by a main body that revolves on a driving source housing outer circumferential surface by being in the coupled state, a cover portion that extends from the main body up to a position facing a sprocket housing outer circumferential surface and prevents the entry of foreign matters through the space between the driving source housing and the drive sprocket, and a mounting bolt that is screwed from the main body to come into abutment with the driving source housing outer circumferential surface to attach and fix the additional protective cover onto the driving source housing, the method being characterized in that at least one of the segments is set with a cover portion end surface in abutment with an alignment jig placed on the sprocket housing outer circumferential surface, and is aligned as the main body becomes separated from the driving source housing outer circumferential surface by screwing the mounting bolt, then the remaining segment is coupled to this aligned segment, and thereafter the mounting bolt is screwed into the remaining segment, thereby attaching and fixing the additional protective cover onto the drive unit housing.

According to the inventions set forth in claims 1 and 6, the additional protective cover can be attached to the driving source housing without having the need to drill a bolt hole in the driving source housing, enabling easy attachment of the additional protective cover in an existing construction machine that has no space to drill a bolt hole.

According to the invention set forth in claim 2, foreign matters that have entered the space between the sprocket housing outer circumferential surface and the cover portion end surface can be discharged through the outlet formed in the cover portion, reducing the risk that the foreign matters might reach the space between the driving source housing and the drive sprocket.

According to the invention set forth in claim 3, the attachment and fixation of the additional protective cover can easily be performed through the alignment thereof, resulting in assembly with less installation error.

According to the invention set forth in claim 4, loosening of the mounting bolt can reliably be prevented.

According to the invention set forth in claim 5, the additional protective cover can reliably be prevented from moving toward the sprocket housing.

BEST MODE FOR CARRYING OUT THE INVENTION

Figure 1:
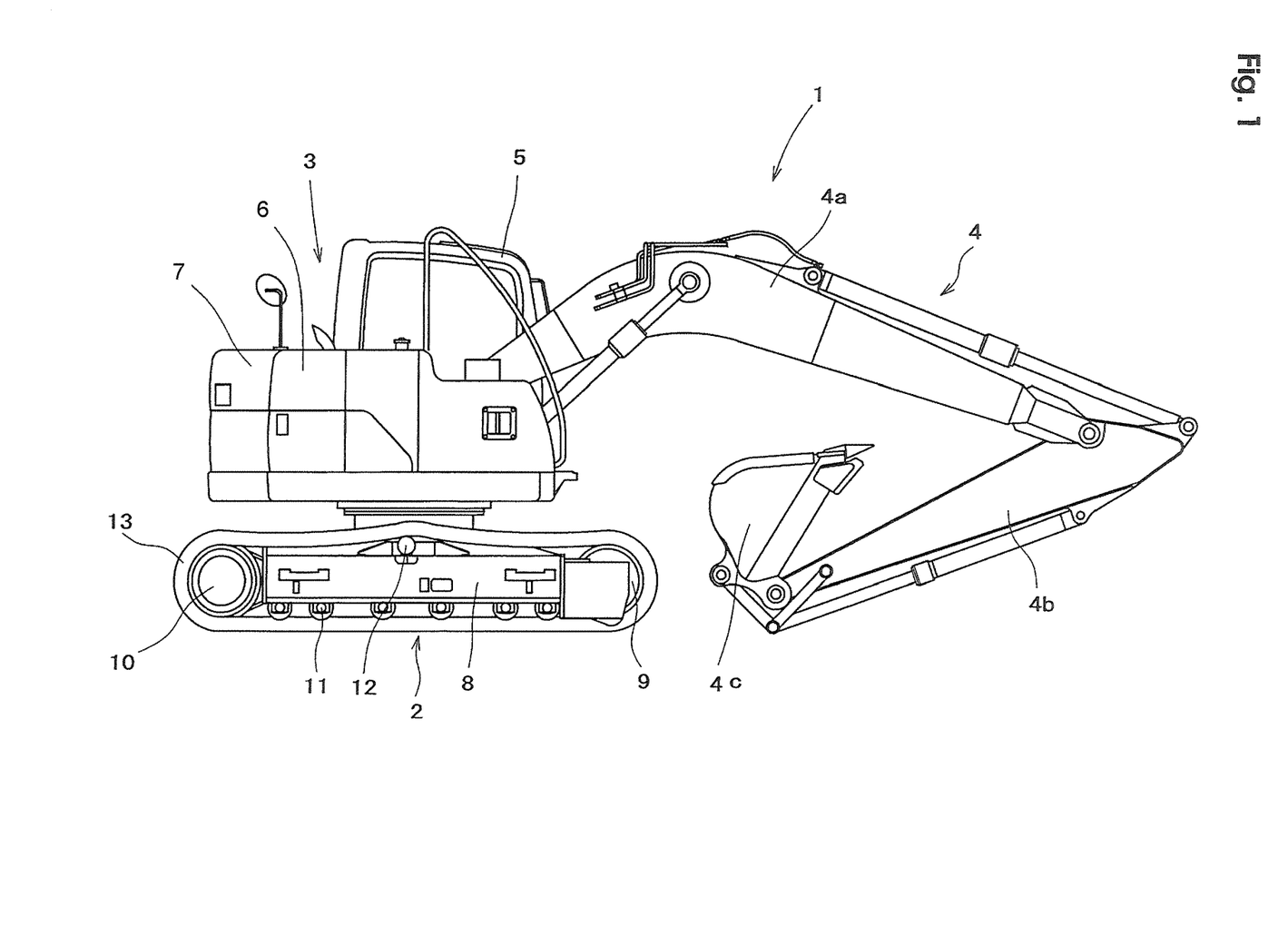
FIG. 1 is a side view of a hydraulic shovel.

A mode for carrying out the present invention is now described hereinafter with reference to the drawings. Reference numeral 1 represents a traveling machine body of a hydraulic shovel. This traveling machine body 1 has an upper revolving body 3 mounted on a lower crawler traveling body 2 so as to be able to revolve about a vertical axis, in which the upper revolving body 3 is provided with various devices such as a front operation unit 4 with a boom 4a, an arm 4b and a bucket 4c, an operator's cab (cab) 5, an engine room 6, and a counterweight 7.

A traveling frame 8, one of the components of the lower traveling body 2, has an idler wheel 9 at a front end portion, a drive sprocket 10 at a rear end portion, track rollers 11 at a lower end portion, and an idler track roller 12 at an upper end portion. A crawler 13 is wrapped around the idler wheel 9, the drive sprocket 10, the lower track rollers 11, and the idler track roller 12.

Figure 2:
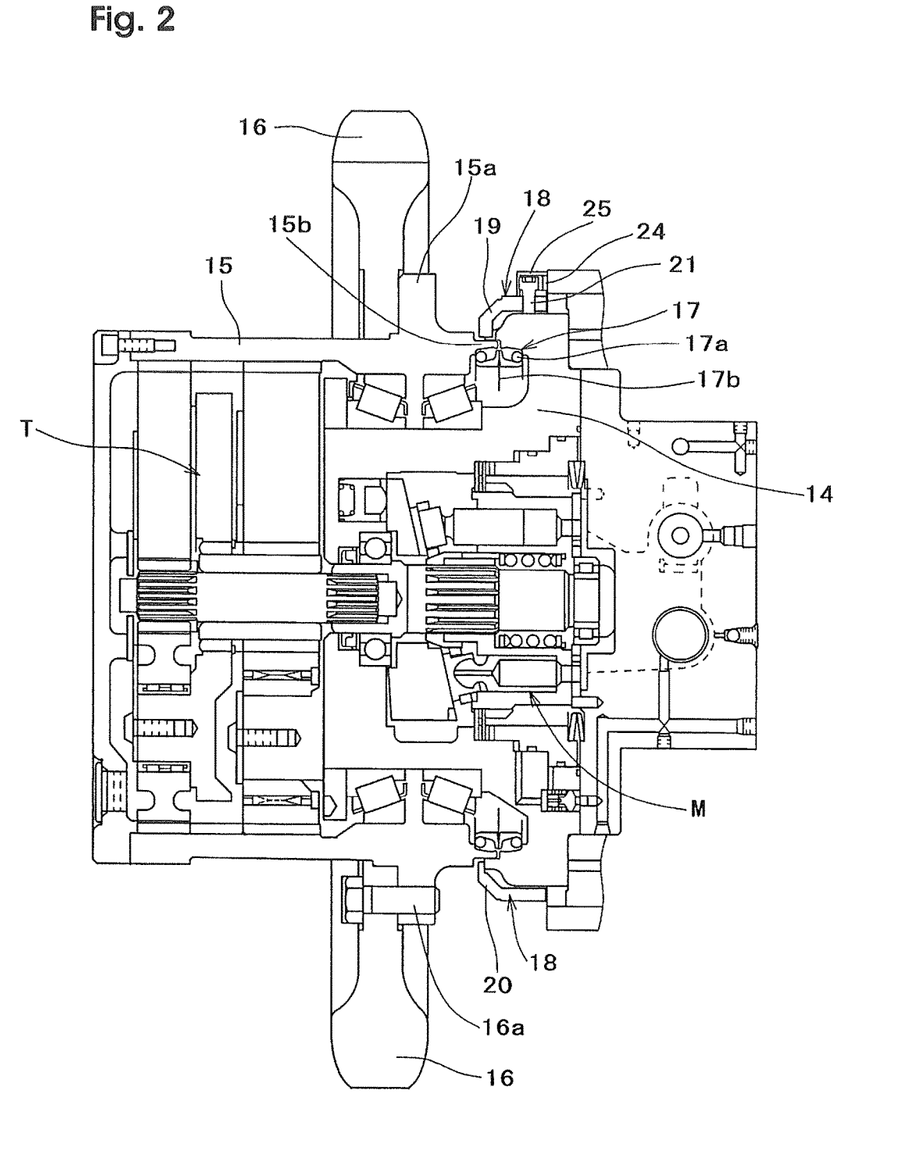
FIG. 2 is a vertical cross-sectional diagram of a drive sprocket.

The drive sprocket 10 is configured to have a hydraulic motor M disposed on an inner side in the lateral direction and a sprocket housing 15 disposed on an outer side in the lateral direction, the hydraulic motor M being installed inside a motor housing (same as the driving source housing of the present invention) 14 fixed to the traveling frame 8 and the sprocket housing 15 being provided rotatably in the motor housing 14. A power transmission mechanism T for transmitting power of the hydraulic motor M to the sprocket housing 15 is installed inside the sprocket housing 15.

The outer circumference of the sprocket housing 15 is provided with a flange 15a. A sprocket 16 that is fitted to the sprocket housing 15 from the outer side in the lateral direction, is fixed to the flange 15a by means of a bolt 16a, thereby integrating the sprocket 16 and the sprocket housing 15.

Figure 4:
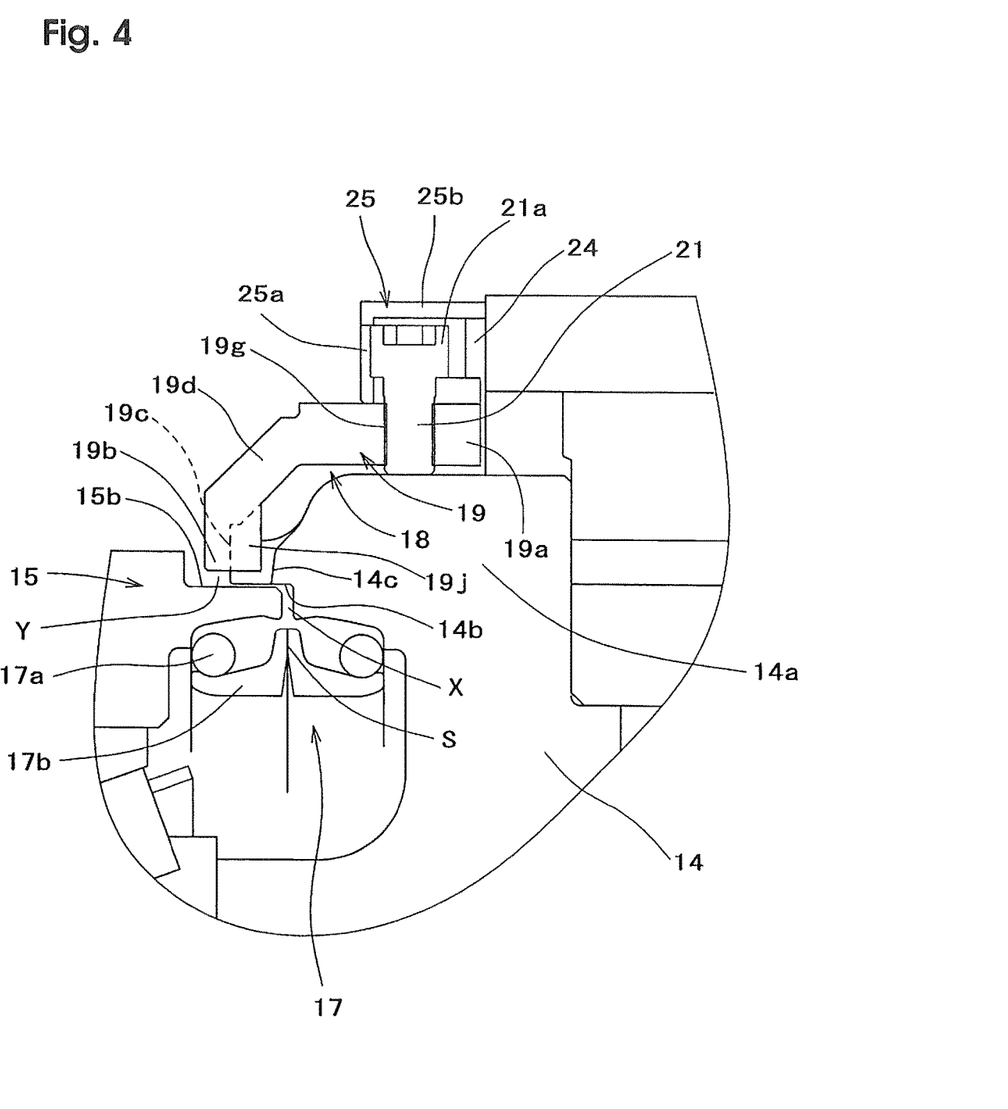
FIG. 4 is an enlarged vertical cross-sectional diagram showing the substantial portions of the part of the drive sprocket to which the additional protective cover is attached.
Figure 5:
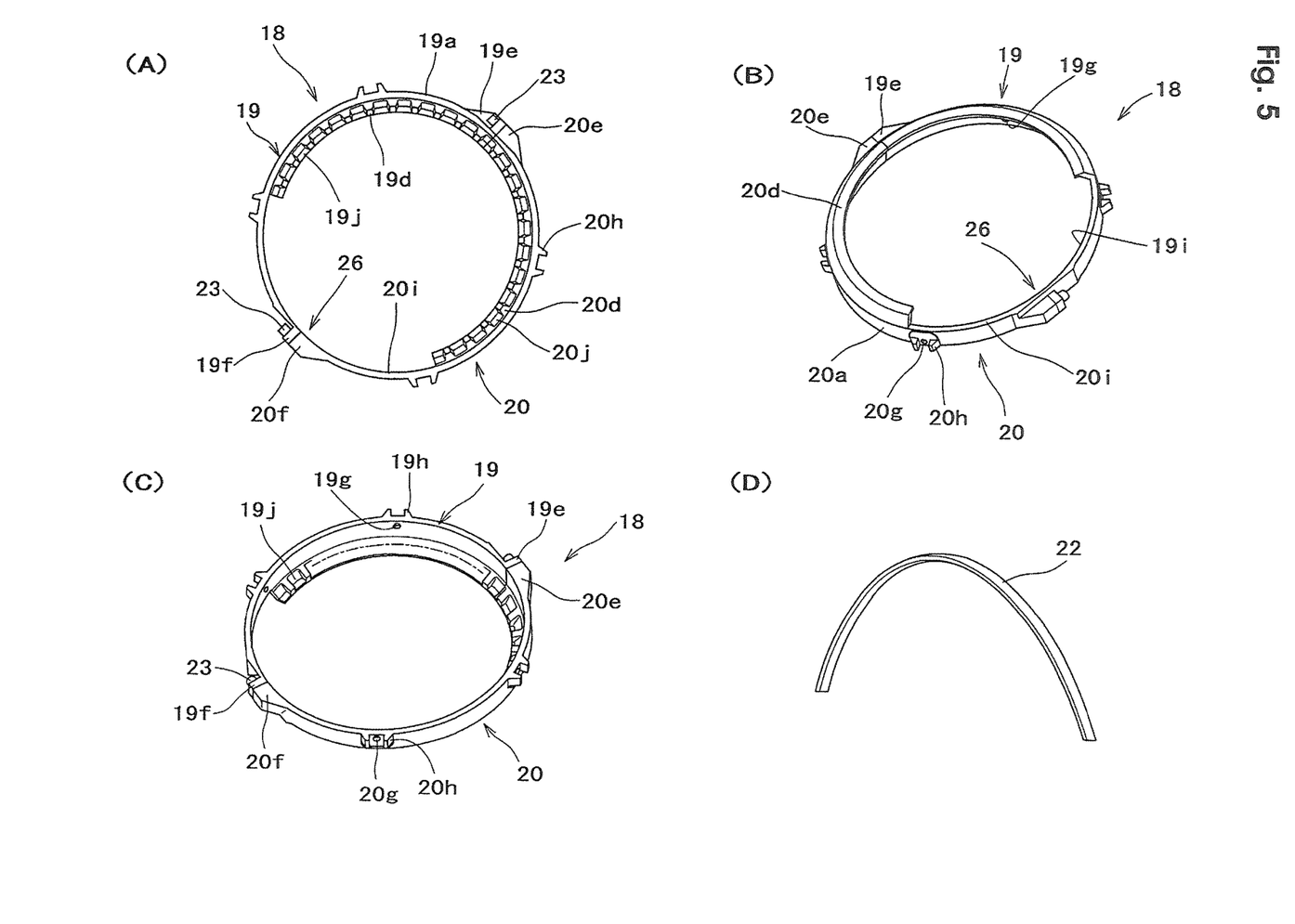
FIGS. 5(A) to 5(D) are, respectively, a rear view, a front perspective view and a rear perspective view of the additional protective cover, and a perspective view of a jig.

An edge portion 14a of the motor housing 14 that faces the sprocket housing 15 is made thick and projects outward in the lateral direction (toward the sprocket housing) into the shape of a flange. An end side portion of the edge portion 14a configures a cutout portion 14b, an upper part of which overhangs (into an inverted L shape) when an upper end part is viewed cross-sectionally as shown in FIG. 4. A slot 14c is formed at an outer diameter part of the cutout portion 14b of the edge portion 14a, with a predetermined distance. An edge portion 15b of the sprocket housing 15 that faces the motor housing 14 is made thin into the shape of a flange while projecting inward in the lateral direction, and cuts into the cutout portion 14b. A space X having an L-shaped cross section, however, is formed between the cutout portion 14b and the sprocket housing edge portion 15b.

A floating seal 17 configured by pairs of O-rings 17a and sealing rings 17b is provided between an inner circumferential surface of the motor housing edge portion 14a that is located on an inner side from the cutout portion 14b in the lateral direction, and an inner circumferential surface of the sprocket housing edge portion 15b. The floating seal 17 is configured in such a manner that sliding surfaces S of the sealing rings 17b slide against each other to enable relative rotation of the sealing rings 17b.

The crawler 13 is moved back and forth by rotation of the sprocket 16 associated with reciprocal drive of the hydraulic motor M, enabling the traveling machine body 1 to travel. This mechanism has been known as in the past.

Figure 3:
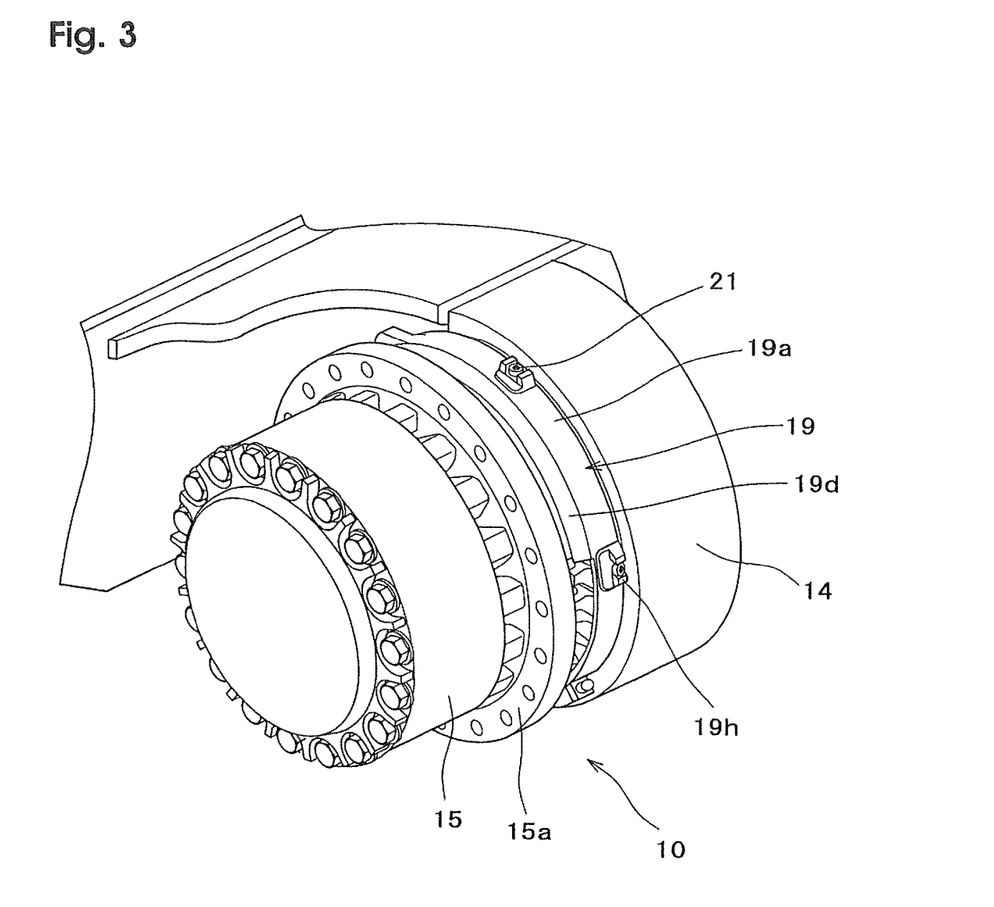
FIG. 3 is a perspective view of a part of the drive sprocket to which an additional protective cover is attached.

Reference numeral 18 represents an additional protective cover for covering the space X between the motor housing 14 and the sprocket housing 15. When assembling a new traveling machine body 1, the additional protective cover 18 is attached to the motor housing 14 prior to attaching the crawler 13 and the sprocket 16. When attaching the additional protective cover 18 to the existing traveling machine body 1, the additional protective cover 18 is attached to the motor housing 14 after the crawler 13 and the sprocket 16 are detached. A configuration of the additional protective cover 18 is described hereinafter in detail, as well as a procedure for assembling the additional protective cover 18.

In the present embodiment, the additional protective cover 18 is divided into two segments, upper and lower half portions 19, 20 (same as "segments" of the present invention). However, the additional protective cover 18 may be divided into three or more segments.

The upper half portion 19 is in the shape of a semicircle and configured by a main body 19a stacked on an upper half outer circumference of the motor housing edge portion 14a, a cover portion 19d that is bent toward the axial center so that its projection tapering from the main body 19a toward the sprocket housing 15 configures a vertical surface (a perpendicular surface), has an end surface (an inner end surface) 19b facing an outer circumferential surface of the sprocket housing edge portion 15b with a space Y therebetween, and has an end portion inner circumferential surface 19c abutting with (or facing) a leading edge of the motor housing edge portion 14a, and first and second coupling portions 19e and 19f that are formed at either ends to couple the upper half portion 19 to the lower half portion 20 described hereinafter. A bolt hole 19g into which an adjusting bolt (same as "mounting bolt" of the present invention) 21 can be screwed is formed in the main body 19a. A flange portion 19h, described hereinafter, is formed in an outer circumference of a rim portion of the bolt hole 19g. A cutout portion 19i, a part of which on the second coupling portion 19f side is cut out, is formed in the cover portion 19d. A projection 19j that is fitted into the slot 14c of the motor housing 14 is formed in an inner surface of the cover portion 19d.

As with the upper half portion 19, the lower half portion 20 has a main body 20a, an end surface 20b, an end portion inner circumferential surface 20c, a cover portion 20d, a first coupling portion 20e, a second coupling portion 20f, a bolt hole 20g, a flange portion 20h, a cutout portion 20i, and a projection 20j.

Figure 7:
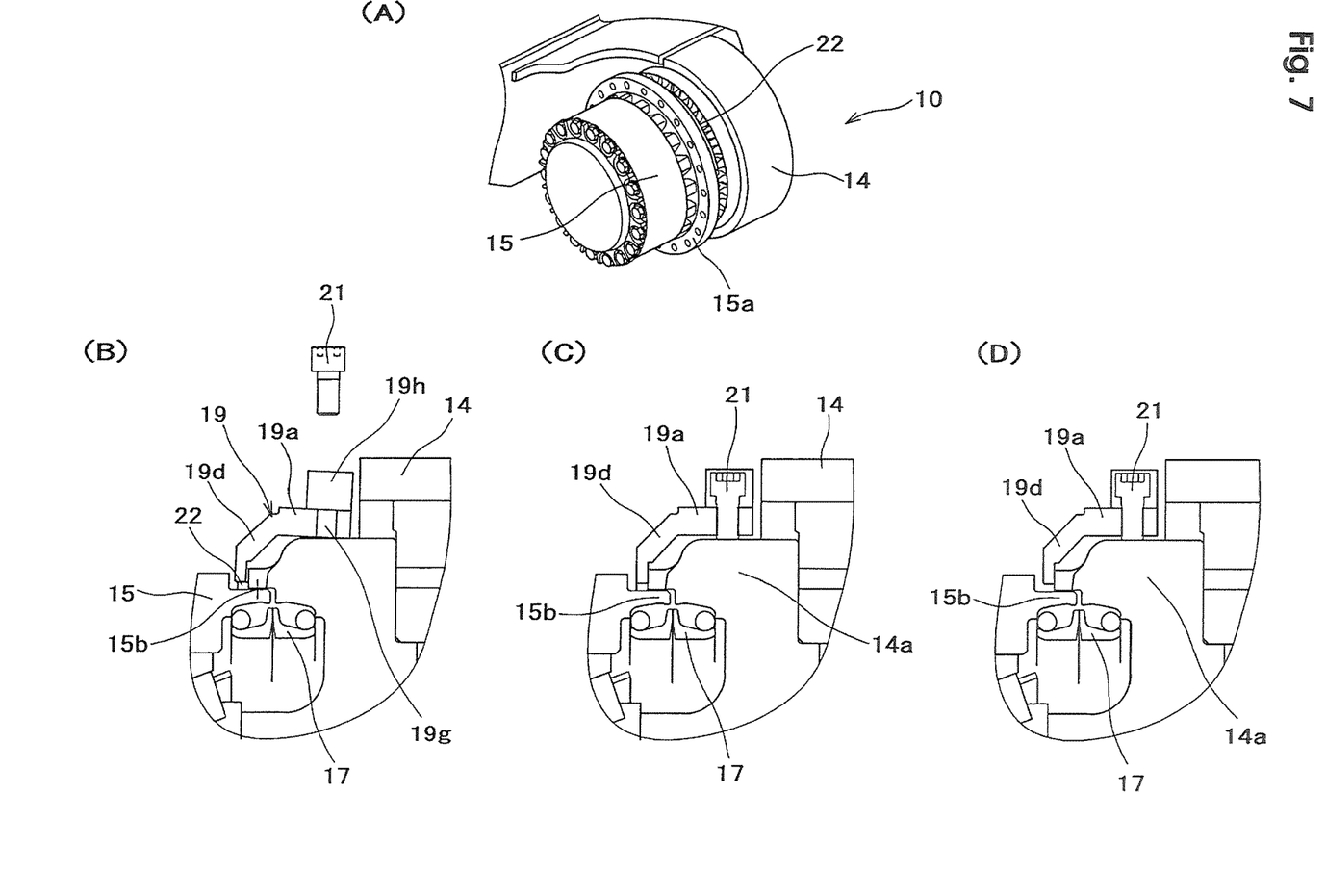
FIGS. 7(A) to 7(D) are each an explanatory diagram illustrating the first half of a procedure for assembling the additional protective cover.

The process for assembling the additional protective cover 18 is described next. The drive sprocket 10 without the crawler 13 and the sprocket 16 is provided, and the whole or the rear end portion of the traveling frame 8 is jacked up to enable an easy work (jacking up is not necessary if the ability to work is not affected). In this state, an arc-shaped jig 22 is installed (set) on an outer circumferential surface of the sprocket housing edge portion 15a in order to attach and align the upper half portion 19 horizontally in the lateral direction (see FIG. 7(A)). In this state, the upper half portion 19 is set in such a manner that the main body 19a comes into abutment with the motor housing edge portion 14a and the cover portion end surface 19b comes into abutment with an outer circumferential surface of the jig 22 (see FIG. 7(B)). Next, the adjusting bolt 21 is screwed into the bolt hole 19g to bring the end of the adjusting bolt 21 into abutment with the motor housing edge portion 14a. Further screwing the adjusting bolt 21 into the bolt hole 19g separates the main body 19a from the motor housing edge portion 14a, but the adjusting bolt 21 is screwed into the bolt hole 19g until the main body 19a is positioned horizontally in the lateral direction (which can be checked using a spirit level) (see FIG. 7(C)). In this manner, the upper half portion 19 can be aligned. The jig 22 is then removed (see FIG. 7(D)).

Figure 6:
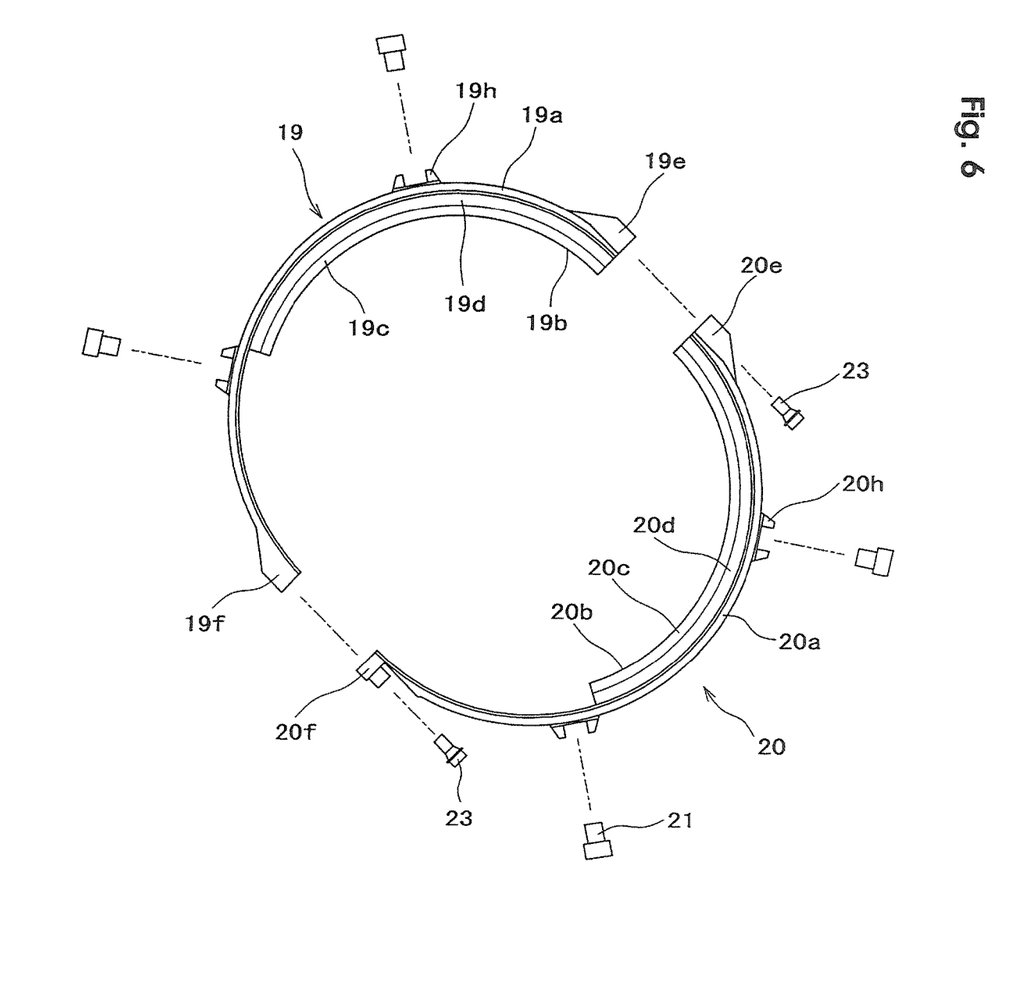
FIG. 6 is an exploded front view of the additional protective cover.

Next, the first coupling portion 20e and the second coupling portion 20f of the lower half portion 20 are brought into abutment against the first coupling portion 19e and the second coupling portion 19f of the upper half portion 19. A coupling bolt 23 is screwed in a tangential direction to fix the first coupling portions 19e and 20e together and the second coupling portions 19f and 20f together, thereby coupling the upper and lower half portions 19 and 20 to each other.

Thereafter, the adjusting bolt 21 is screwed and tightened into the bolt hole 20g formed in the main body 20a of the lower half portion 20 until the end of the bolt comes into abutment with the motor housing edge portion 14a. In this manner, the basic step of attaching and fixing the additional protective cover 18 is ended (see FIG. 8(A)).

Attaching the additional protective cover 18 in this manner can cover the upper half and front half of the drive sprocket 10, which are susceptible to the entry of sediments and the like, with the cover portions 19d and 20d, preventing the entry of sediments and the like into the space X between the motor housing 14 and the sprocket housing 15. When foreign matters such as sediments enter the space Y between the cover portion end surface 19b, 20b and the sprocket edge portion 14a, such sediments are carried to the sprocket housing 15 and discharged to the outside from an outlet 26 configured by the cutout portions 19i, 20i in the lower and rear half portion of the additional protective cover 18, preventing the entry of the sediments into the space X.

The rest of the step is executed to prevent displacement of the attached additional protective cover 18 and loosening of the adjusting bolt 21. A pair of flange portions 19h, 20h are provided in a protruding manner to sandwich the bolt holes 19g, 20g for the adjusting bolt 21 in a circumferential direction of the motor housing edge portion 14a, and a leg portion 24a of a channel material 24 in the shape of an inverted C is inserted between a bolt head 21a of the adjusting bolt 21 and the flange portions 19h, 20h, thereby locking the channel material 24. An adjusting bolt 21 is locked by welding (adhering) 24b the channel material leg portion 24a to the bolt head 21a (see FIG. 8(B)).

Figure 8:
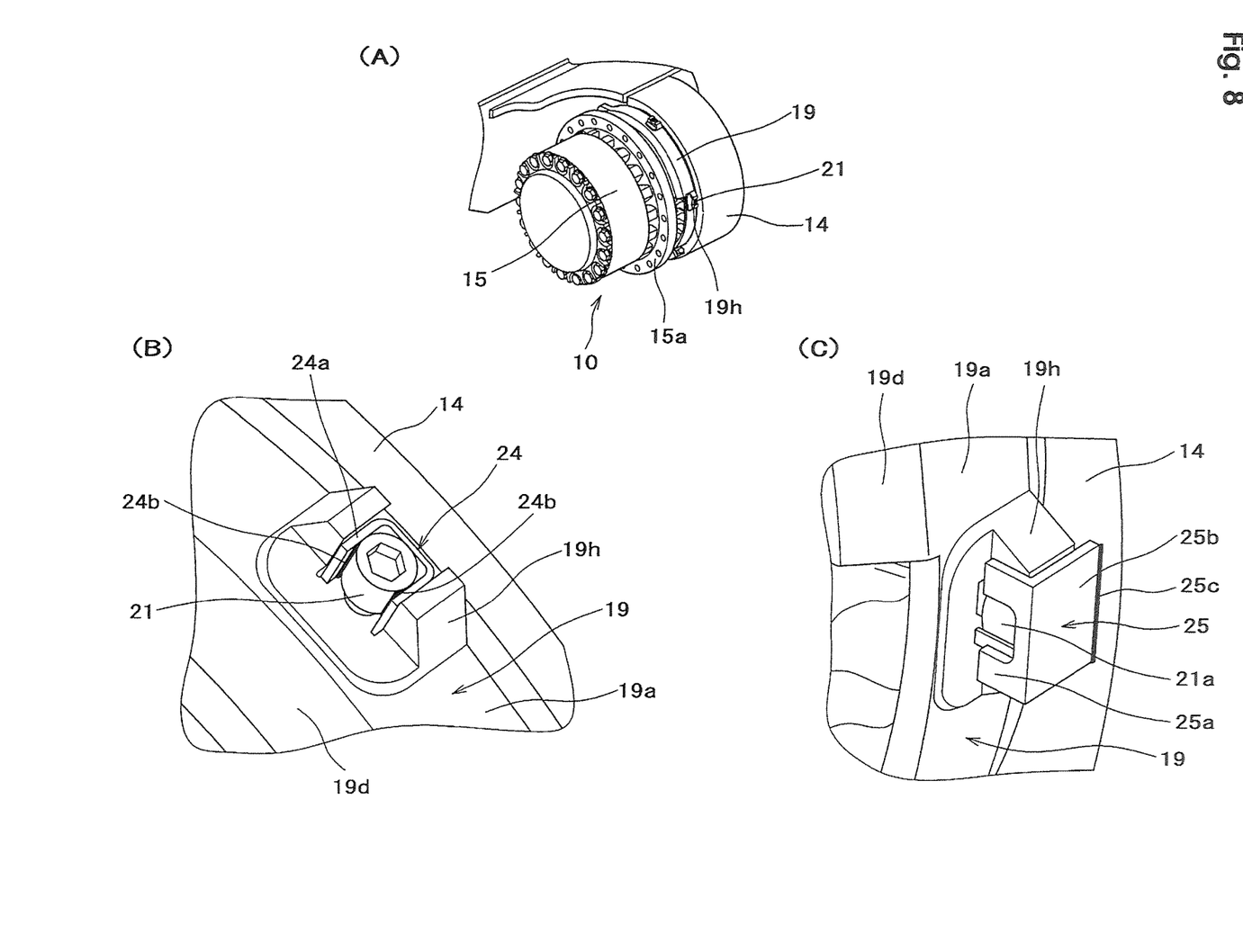
FIGS. 8(A) to 8(C) are each an explanatory diagram illustrating the last half of the procedure for assembling the additional protective cover.

When a piece 25 a of an L-shaped angle 25 is brought into abutment with an end of the channel material leg portion 24 a, the piece 25 a is engaged with a part of the bolt head 21 a on the sprocket housing 15 side, while the other piece 25 b is set to abut with an outer circumferential surface of the motor housing 14 and welded (adhered) 25c to the motor housing 14 (see FIG. 8(C)), thereby restricting the additional protective cover 18 from moving toward the sprocket housing 15, and ending the process for attaching and fixing the additional protective cover 18.

Because the drive sprocket 10 is provided on the right-hand side and the left-hand side, the process for attaching and fixing the additional protective cover 18 is carried out twice in a single hydraulic shovel.

In the mode for carrying out the present invention described above, the entry of foreign matters such as sediments into the space X between the stationary motor housing 14 and the movable sprocket housing 15 can be prevented by the labyrinth structure configured by the cover portions 19d, 20d provided in the additional protective cover 18, resulting in prevention of wear of the floating seal 17. The additional protective cover 18 is configured as upper and lower, two divided parts, in which the upper half portion 19 is set in such a manner that the main body 19a is brought into abutment with the motor housing edge portion 14a and the cover portion end surface 19b comes into abutment with the outer circumferential surface of the jig 22 for alignment, and then the adjusting bolt 21 is gradually screwed into the bolt hole 19g so that the bolt end comes into abutment with the motor housing 14 and the main body 19a separates from the motor housing edge portion 14a. As a result, the upper half portion is ready to be aligned. In this state, screwing of the adjusting bolt 21 is stopped, completing the alignment of the upper half portion 19.

Subsequently, for the lower half portion 20, the first coupling portions 19e and 20e and the second coupling portions 19, 20f are set adjacent to each other and coupled using the coupling bolt 23. Thereafter, the adjusting bolt 21 is screwed into the bolt hole 20g of the lower half portion 20 until the bolt end comes into abutment with the surface of the motor housing 14, completing the basic attachment of the additional protective cover 18.

Because the additional protective cover 18 can be attached to the motor housing 14 without having the need to drill a bolt hole in the motor housing, the additional protective cover 18 can be attached even when the motor housing 14 has no space for a bolt hole. Therefore, the additional protective cover 18 can be attached later to the existing traveling machine body 1 that has no such space. In addition, owing to the fact that there is no need to drill a bolt hole in the motor housing 14, the time it takes for the process for attaching the additional protective cover 18 can be reduced, and the user does not need to entrust his construction machine for a long period of time.

In this additional protective cover 18, due to the outlet 26 that is formed by cutting a part of the cover portion, even when foreign matters such as sediments enter the space Y between the cover portion end surface 19b, 20b and the outer circumferential surface of the sprocket edge portion 14a, such foreign matters are carried to the sprocket housing 15 and discharged from the outlet 26, preventing the foreign matters accumulated in the space Y from entering the space X between the motor housing 14 and the sprocket housing 15, and protecting the floating seal 17.

Because the lower half portion 20 of the additional protective cover 18 is configured to be assembled while the upper half portion 19 is aligned by the jig 22 and the adjusting bolt 21, such a configuration of the additional protective cover 18 can achieve the easy assembly with good alignment of the upper half portion 19.

By locking the bolt head 21a of the adjusting bolt by means of the channel material 24, the additional protective cover 18 that is attached as described above can be restricted from moving toward the sprocket housing 15 by the angle 25 fixed to the motor housing 14. Therefore, the present invention can prevent the additional protective cover 18 from being displaced casually.

It goes without saying that the present invention is not limited to the foregoing embodiment. For example, when the additional protective cover is divided into two segments, only the lower half portion may be provided with the cutout portion for forming the outlet.

INDUSTRIAL APPLICABILITY

The present invention can be utilized in the field for preventing the entry of foreign matters into the drive sprocket of a construction machine with a crawler traveling body, such as a hydraulic shovel.

The invention claimed is:

1. An additional protective cover for a crawler traveling body, the crawler traveling body including a driving source housing fixed to a traveling frame and a sprocket housing configured to be rotatable with respect to the driving source housing, the additional protective cover covering a first space between the driving source housing and the sprocket housing to prevent entry of foreign matter into the first space, the additional protective cover comprising:
    at least two divided segments in which a coupling portion is provided at each of adjacent end portions of the segments such as to be coupled with one another by means of a coupling bolt, each segment of the at least two divided segments including:

a main body coupled to and disposed circumferentially about an outer circumferential surface of the driving source housing, and a cover portion that extends from the main body to a position facing an outer circumferential surface of the sprocket housing, the main body defining an adjusting bolt hole therethrough; and an adjusting bolt screwed into the adjusting bolt hole of the main body, an end of the adjusting bolt extending beyond the main body and disposed in abutment with the outer circumferential surface of the driving source housing to attach and fix the additional protective cover onto the driving source housing.

2. The additional protective cover according to claim 1, further comprising an outlet for discharging foreign matter that enters a second space between the outer circumferential surface of the sprocket housing and an end surface of the cover portion.

3. The additional protective cover according to claim 1, further comprising an alignment jig placed on the outer circumferential surface of the sprocket housing in abutment with the cover portion of at least one of the segments, wherein the at least one of the segments is aligned as the main body becomes separated from the driving source housing outer circumferential surface by screwing the adjusting bolt into the adjusting bolt hole.

4. The additional protective cover according to claim 1, wherein the adjusting bolt is locked by being adhered to a channel material that is inserted, in locked fashion, between a flange portion provided in a protruding manner in the main body and a bolt head of the adjusting bolt.

5. The additional protective cover according to claim 1, wherein displacement of the additional protective cover toward the sprocket housing is prevented by adhering an angle to the driving source housing, the angle being configured to come into engagement with a part of a head of the adjusting bolt at a side of the sprocket housing.

6. A method for assembling the additional protective cover according to claim 1 to the crawler traveling body, the at least two divided segments including a first segment and a second segment, the adjusting bolt being a first adjusting bolt, the method comprising:

setting the first segment with an end surface of the cover portion in abutment with an alignment jig placed on the outer circumferential surface of the sprocket housing, aligning the first segment by screwing the first adjusting bolt into the adjusting bolt hole to separate the main body from the outer circumferential surface of the driving source housing, coupling the second segment to the first segment, and screwing a second adjusting bolt into the second segment, thereby attaching and fixing the additional protective cover onto the driving source housing.

7. The additional protective cover according to claim 1, wherein a longitudinal centerline of the adjusting bolt intersects with the end of the adjusting bolt and the outer circumferential surface of the driving source housing.

* * * * *